(12) United States Patent  (10) Patent No.: US 7,688,179 B2
Kurpinski et al.  (45) Date of Patent: Mar. 30, 2010

(54) HANDS-FREE VEHICLE DOOR OPENER (75) Inventors: Christopher M Kurpinski, Berkley, MI (US); Justin P McBride, West Bloomfield, MI (US); Keiichi Aoyama, Novi, MI (US); Thomas J Keeling, Plymouth, MI (US); Michael A Wiegand, Birmingham, MI (US); Tanemichi Chiba, Novi, MI (US); Hiroto Uesaka, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 875 days.

(21) Appl. No.: 11/301,076

(22) Filed: Dec. 12, 2005

(65) Prior Publication Data

US 2007/0132552 A1    Jun. 14, 2007

(51) Int. Cl.
B60R 25/00    (2006.01)
(52) U.S. Cl. ................. 340/5.72; 340/5.64; 340/825.19
(58) Field of Classification Search ................ 340/5.76, 340/5.64, 825.72, 10.1, 10.2, 825.69, 825.31, 340/5.7, 5.71, 5.61, 5.62, 5.72, 825.19, 1; 292/266, 269, 279
See application file for complete search history.

(56) References Cited

U.S. PATENT DOCUMENTS

| 2,888,290 | A | * | 5/1959 | Pierce ..................... 292/251.5 |
| 3,664,698 | A | * | 5/1972 | Stropkay .................... 292/201 |
| 4,421,350 | A | * | 12/1983 | Gotomyo ..................... 292/123 |
| 4,612,729 | A | * | 9/1986 | Sato ............................. 49/362 |
| 4,815,046 | A | * | 3/1989 | Dorr ........................... 367/95 |
| 5,140,316 | A | * | 8/1992 | DeLand et al. ......... 340/825.69 |
| 5,369,911 | A | * | 12/1994 | Fortunato ....................... 49/25 |
| 5,644,172 | A | * | 7/1997 | Hodges ..................... 307/10.5 |
| 5,646,591 | A | * | 7/1997 | Issa et al. .................... 340/566 |
| 5,663,704 | A | * | 9/1997 | Allen et al. ............ 340/426.25 |
| 5,682,135 | A | * | 10/1997 | Labonde ................ 340/426.17 |
| 5,774,064 | A | * | 6/1998 | Lambropoulos et al. ...................... 340/825.69 |
| 5,894,905 | A | * | 4/1999 | Abels et al. .................. 180/268 |
| 6,218,929 | B1 | | 4/2001 | Furuta et al. |
| 6,293,050 | B1 | * | 9/2001 | Johnk .......................... 49/276 |
| 6,600,285 | B2 | * | 7/2003 | Mintgen et al. ............. 318/468 |
| 6,711,856 | B1 | * | 3/2004 | Hoffman ..................... 49/386 |
| 6,825,752 | B2 | | 11/2004 | Nahata et al. |

(Continued)

*Primary Examiner*—Daniel Wu
*Assistant Examiner*—Rufus Point
(74) *Attorney, Agent, or Firm*—Harness, Dickey & Pierce, PLC (57) ABSTRACT A hands-free vehicle door opener utilizes a spring-loaded mechanical pushing device, or other method, to open a vehicle door a few inches upon a laser emitting device sensing a foot in its emitted laser. The laser is emitted from the laser emitter upon the key fob of a smart key being validated by the vehicle's smart key validation system when a user approaches the vehicle with the smart key fob. When the laser beam is interrupted, a signal is sent from a smart ECU to a door lock ECU, which unlocks the vehicle door. Next, a signal is sent to a door open ECU to unlatch the vehicle door. Upon door unlatching, the spring-loaded pushing device pushes open the vehicle door. Instead of a laser emitting device being used as the sensor, a device with electrical contacts, an ultrasonic wave emitting sensing device, or other device could be used.

7 Claims, 6 Drawing Sheets

U.S. PATENT DOCUMENTS

| | | | |
|---|---|---|---|
| 6,856,239 B1 * | 2/2005 | Hicks | 340/5.7 |
| 6,886,856 B2 * | 5/2005 | Canterberry et al. | 280/741 |
| 7,034,485 B2 * | 4/2006 | Kuan et al. | 318/466 |
| 7,219,945 B1 * | 5/2007 | Zinn et al. | 296/56 |
| 2001/0054952 A1 | 12/2001 | Desai et al. | |
| 2002/0190842 A1 * | 12/2002 | Sasaki et al. | 340/5.31 |
| 2003/0222758 A1 * | 12/2003 | Willats et al. | 340/5.72 |
| 2008/0143139 A1 * | 6/2008 | Bauer et al. | 296/146.1 |

* cited by examiner

HANDS-FREE VEHICLE DOOR OPENER

FIELD OF THE INVENTION

The present invention relates to a hands-free vehicle door opener, and more specifically, to a device that permits an initial opening of a vehicle door without using a human hand.

BACKGROUND OF THE INVENTION

Vehicular door unlocking devices permit unlocking of a vehicle in a variety of ways. Traditionally, metal hand-held keys have been used in vehicular locks while more modern methods include the use of an electronic key in which the vehicle establishes wireless communication with a hand-held fob upon a user pressing a fob unlock button. This method permits wireless unlocking of the vehicle doors when a user is a predetermined distance away from the vehicle. In other modern methods, a key fob retained within a pocket or purse automatically establishes wireless communication with the vehicle, thereby placing a vehicle door lock in unlock standby mode, when the fob enters a specific communication range of the vehicle. While such improvements in unlocking vehicle doors have proven satisfactory for their purposes, gaining entry to a vehicle has generally required the use of a user's hand to physically pull a vehicle door handle after the door has been unlocked. Accordingly, a need exists for an apparatus and method for unlocking and opening a vehicle door that does not require the physical use of a hand.

SUMMARY OF THE INVENTION

A hands-free vehicle door opener is disclosed. The hands-free vehicle door opener may work in conjunction with a traditional "smart key" system and may be employed by a person whose hands are occupied as he or she approaches a vehicle. Because of the hands-free vehicle door opener, a person may place a package into the vehicle without setting the package down outside of the vehicle to open a vehicle door. Additionally, the door opener may employ a detector that is capable of detecting a physical object and trigger the opening of a door. The detector could be a laser beam emitter, an ultra-sonic emitter, a voice detector, or other detection device. Alternatively, a mechanical contact switch or other mechanical device could be used instead of a wave-related detector. Such a detector or switch may be located on the vehicle exterior proximate a door to be opened, for example. Upon activation of the detector, a particular door of the vehicle may open to provide access to a user.

The door opening process may begin, for example, when a user approaches a vehicle with a smart key fob, the identity of which is verified by a vehicle ECU, such as a "smart ECU." After the key fob is verified, the door lock of the door that the user approaches is placed into unlock standby mode. Upon the lock being placed into unlock standby mode, a laser emitter, for example, is activated. The laser emitter may be located below the door that is desired to be opened. When the user places his or her foot under the emitting laser beam, another vehicle ECU invokes unlocking of a door lock and then unlatching of a door latch of the door to be opened. Upon latch unlatching, a spring-loaded "door popper" may cause the door to open an inch or two, for example. With the door open this amount, the user may use his or her elbow or knee to further open the vehicle door. Although the hands-free vehicle door opener was explained in conjunction with a smart key entry system, such is not required, and other entry systems may be used in conjunction with the hands-free vehicle door opener.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. With reference to FIGS. 1-9, a pickup truck 10 employing a hands-free vehicle door opener 12 will now be described. A hands-free vehicle door opener 12 of the present teachings may be used in conjunction with a "smart key" type of entry system, which will first be described as an example of how a hands-free vehicle door opener 12 may be employed.

Figure 1:
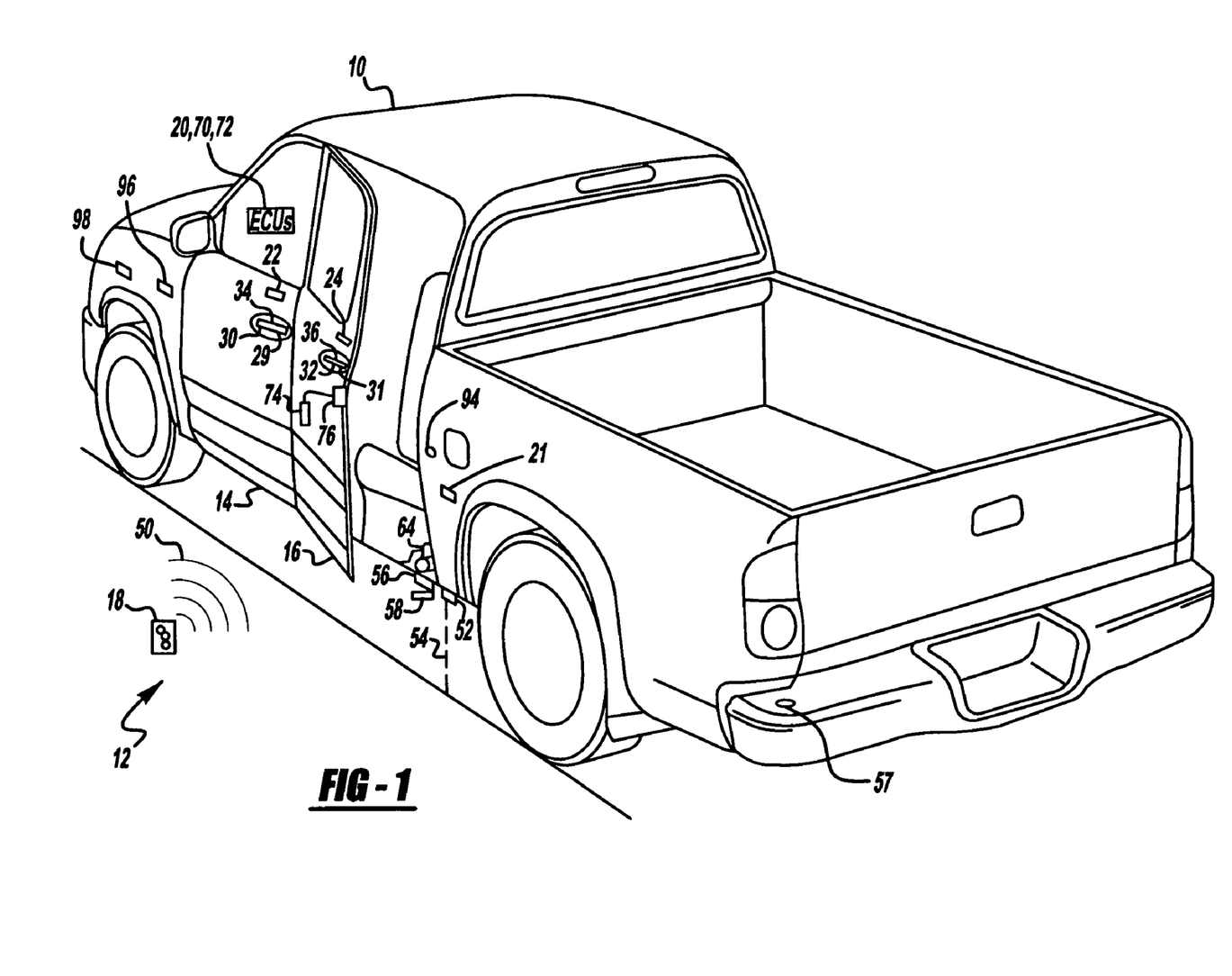
FIG. 1 is a perspective view of a vehicle having a hinged-door depicting various locations of components for a hands-free vehicle door opener.

With reference to FIG. 1, one type of "smart key" entry system permits a vehicle user to approach a vehicle 10 with a fob 18 which places a door 14 or other vehicle access point (i.e., a trunk, lift gate, sliding door, etc.) of a vehicle 10 in an unlock standby mode without manipulating any buttons on the fob 18. To accomplish automatic door unlocking, the user must simply possess a smart key fob 18, also known as a transponder or electronic key, and walk within a specific radio frequency communication range of the vehicle 10 so that communication can be made between antennas 22, 24 and at least one ECU, such as a smart ECU 20, within the vehicle 10. When the user then, for example, touches a sensor 36 on a door handle 32 of a door 16, a door lock 31 will unlock. The user may then pull on the door handle 32 to complete opening of the door 16.

Figure 3:
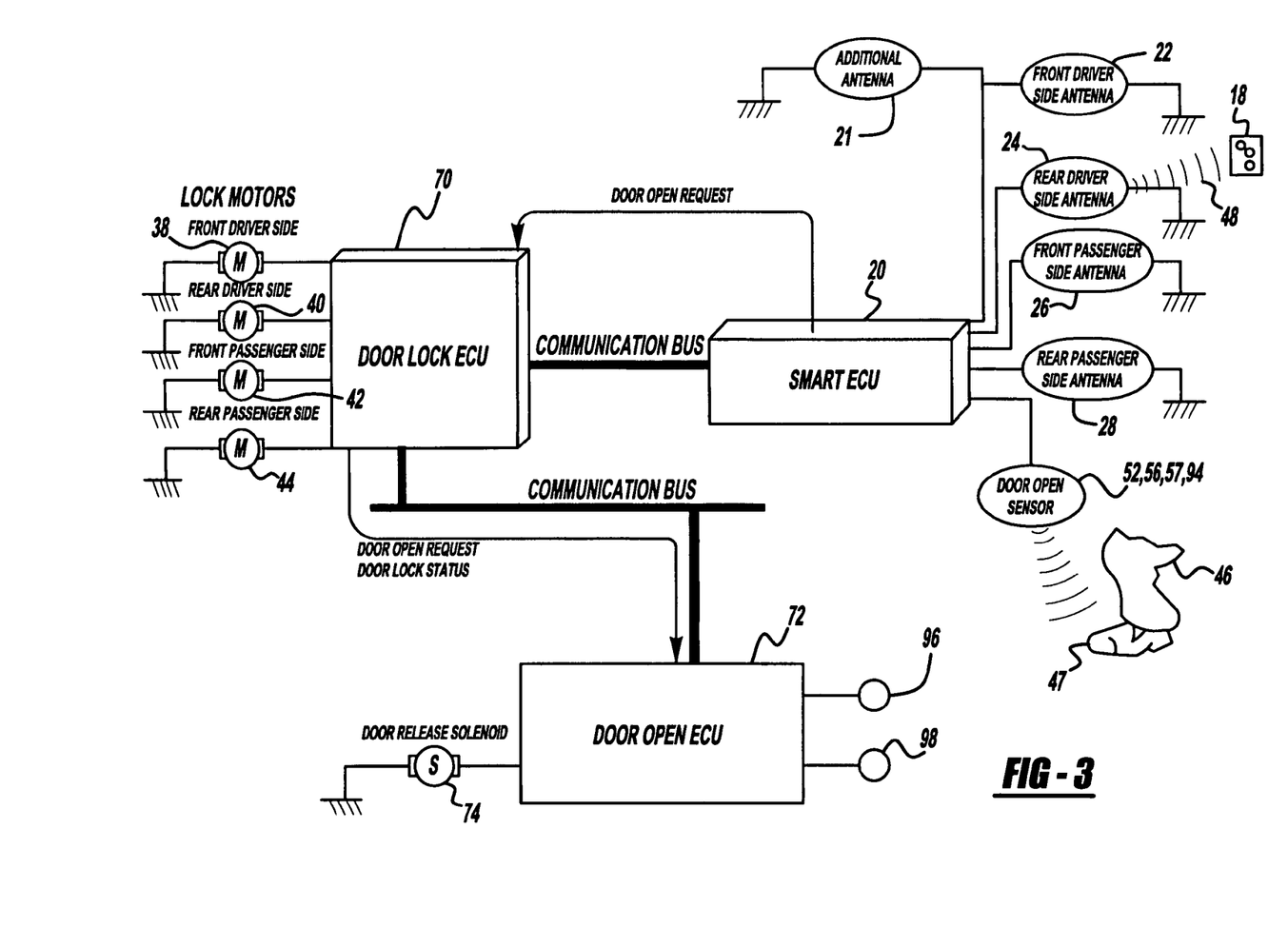
FIG. 3 is a diagram of flow logic and components pertaining to operation of a hands-free door opener.

More specifically, with reference to FIGS. 1 and 3, the vehicle 10 possesses a variety of electronic control units, ("ECUs"), one of which is a smart ECU 20 that communicates with the smart key fob 18 to place the locks 29, 31 in an unlock standby mode. Unlocking of the vehicle door locks 29, 31 is accomplished in a subsequent process. In a traditional smart key system, before a user approaches the vehicle 10, that is, when a user is outside of the communication range of the smart ECU 20, the smart ECU 20 causes a specific radio frequency signal to be emitted in a polling fashion from various antennas located within the vehicle 10. Typical antennas are door antennas 22, 24 within the doors 14, 16, or antennas at the corners of the vehicle, within the fenders and quarter panels. The signal is pulsed at a specific time interval and may be pulsed in a polling fashion taking into consideration all of the on-board antennas. For instance, there may be a front driver side antenna 22, a rear driver side antenna 24, a front passenger side antenna 26, and a rear passenger side antenna 28 that each emit a radio frequency at a specific strength up to a specific, given radius from the respective antenna at a given time interval.

In addition to door antennas, there may be an antenna proximate the vehicle trunk for controlling the unlocking of the trunk in conjunction with the fob 18. Additionally, a rear lift gate, or sliding door may be so equipped. Regarding the trunk, the smart key system may be placed into unlock standby mode when a user walks within the communication range with the fob 18, the system prepared to accept the signal emitted by the fob 18 when the fob 18 is within range. The communication radius is normally three or four feet, and may be determined by the manufacturer. A user 46 may then simply touch the vehicle trunk handle to unlock the trunk. The same would hold true for the vehicle door handles. However, with the hands-free vehicle door opener system 12, the door handles of the respective door would not have to be touched to unlock the respective door.

Next, when the transponder 18 is within the communication radius of an antenna 22, 24, 26, 28, the fob 18 may relay a unique security code to the smart ECU 20, and when the ECU 20 recognizes the unique security code, the door locks of the vehicle 10 are placed into unlock standby mode. In the case of FIG. 1, the front driver side lock 30 or the rear driver side lock 32 may be placed into condition of unlock standby when the transponder 18 is within the communication zone radius of the respective door antennas 22, 24. When in unlock standby mode, the door handles 30, 32 may be touched in a specific area, say on their rear sides, to activate a contact sensor 34, 36, one within each of the door handles 30, 32. The hands-free vehicle door opener system 12 may be configured to operate such that the door antenna 22, 24 that the fob 18 is closest to will be the only door lock that is placed in unlock standby mode. Since each door lock has a door lock motor, any one of the front driver side door lock motor 38, rear driver side door lock motor 40, front passenger side door lock motor 42, or rear passenger side door lock motor 44 can be configured to activate, depending upon the location of the fob 18 and which contact sensor 34, 36, for example, is contacted. For purposes of this description, the rear driver side door 16 will be used as an example door to be opened. Further description of a smart key system is disclosed in commonly owned U.S. Patent Application Publication 2004/0119628.

With continued reference to FIGS. 1-9, an example operation of the vehicle hands-free door opener 12, and its use to open rear door 16, will be described. As a user 46 approaches the vehicle 10, the smart ECU 20 emits a radio frequency signal 48 from the rear driver side antenna 24. Actually, each door antenna 22, 24, 26, 28 may emit a radio frequency signal in a polling fashion. When the fob 18 is brought within the range of the smart ECU 20 signal 48, the fob 18 responds with a fob signal 50 and the smart ECU 20 verifies the fob signal 50 and as a result, verifies the specific fob 18. As a result of the verification process, the door lock 31 is placed in unlock standby mode. Again, the system may be configured to only place door lock 31 in unlock standby mode because the fob 18 is closest to door lock 31. While in unlock standby mode, the contact sensor 36 within the door handle 32 is prepared to receive physical contact, such as from a human hand to unlock door lock 31. However, at this juncture, an option involving the teachings of the present invention become evident, as will now be described.

Although the user 46 may use his or her hand to touch the door handle 32 and invoke the contact sensor 36 to unlock the door lock 31 as described above, the teachings permit the invocation of the hands free vehicle door opener 12. More specifically, if a user's hands are occupied, or if the user 46 does not want to use her hands for some reason, then the user 46 may invoke the following to not only unlock the door lock 31, but also "pop open" the vehicle door 16.

Figure 2:
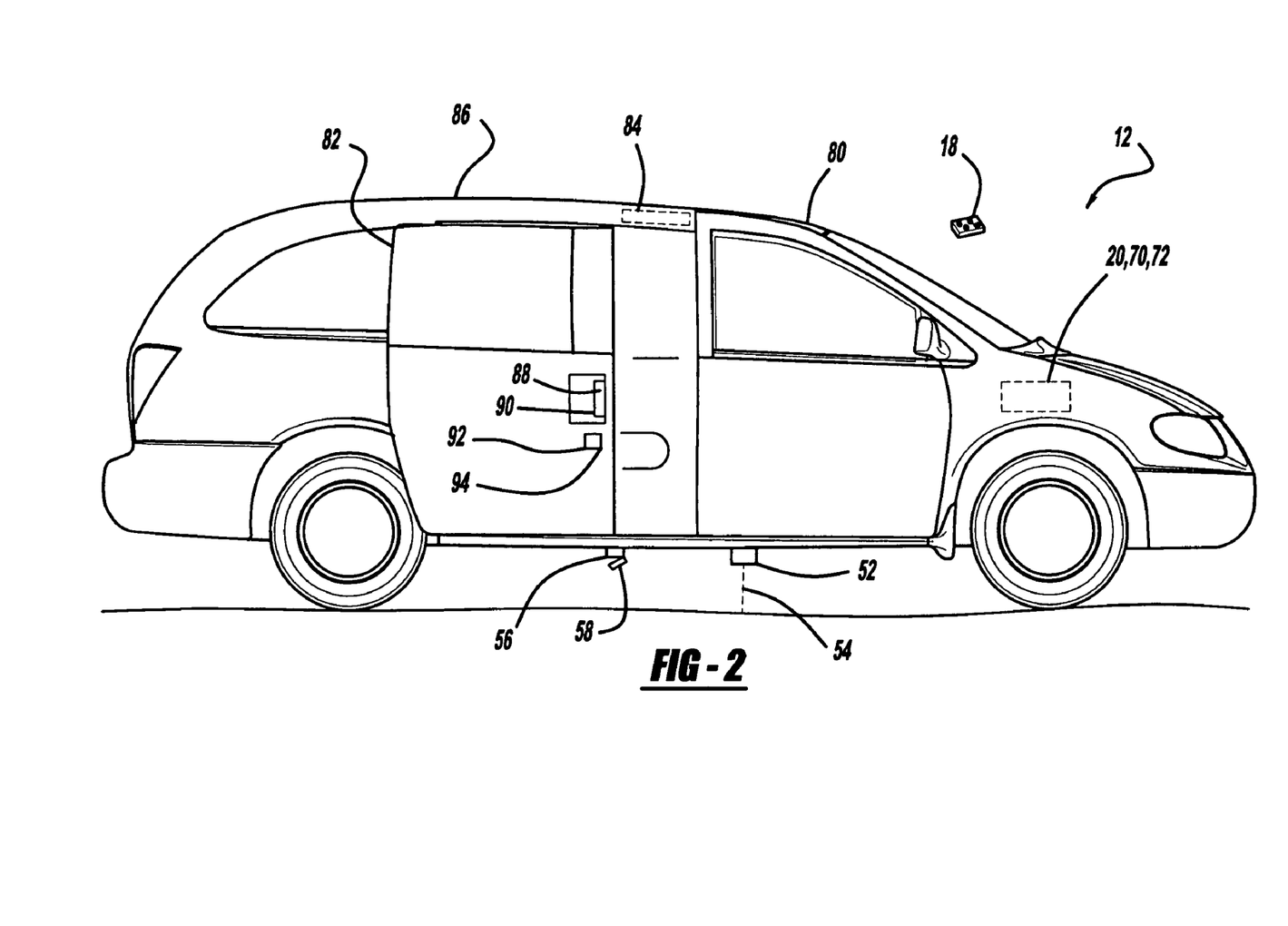
FIG. 2 is a perspective view of a vehicle having a sliding door depicting various locations of components for a hands-free vehicle door opener.
Figure 6:
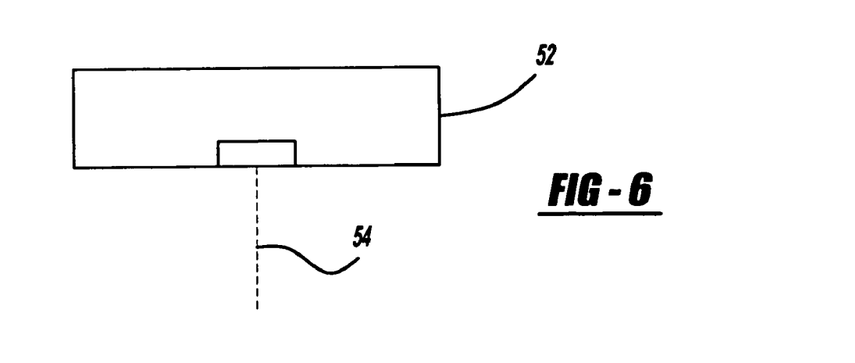
FIG. 6 is a side view of a laser emitter used to activate a solenoid device.

As a first method of unlocking the door lock 31 and physically opening the door 16, a laser emitter 52 will be described. For instance, when the door lock 31 is placed in unlock standby mode, when the fob 18 enters the radio frequency range of the antenna 24 and the fob 18 communicates its specific identification code which is verified through the smart ECU 20, a laser emitter 52 begins emitting a laser beam 54, as depicted in FIGS. 1, 2 and 6. The laser emitter 52 may be positioned directly below the rear door 16 as depicted in FIG. 1, or in another convenient location on the vehicle 10. When a user's hands are occupied, the user 46 need only move her foot 47 through the laser beam 54, which is directed toward the ground in FIGS. 1 and 2. By interrupting the laser beam 54, the door 16 is caused to unlock, unlatch, and open.

By "open," the door is at least "popped open" so that it is no longer secured by a door latch and is free to be swung open when a user so desires. When the laser beam 54 is interrupted, a signal is sent to the smart ECU 20, which then sends a door open request signal to a door lock ECU 70. The door lock ECU 70 causes the rear driver side lock motor 40 to activate and unlock the door lock 31.

Immediately after unlocking of the door lock 31, communication continues and a signal may be sent from the door lock ECU 70 to the door open ECU 72, which activates a door release solenoid 74. The door release solenoid 74 causes a door latch 76 to release the rear door 16 so that the door 16 is capable of being opened after it is unlocked. Although a door release solenoid 74 is described as a method of unlatching a door latch 76, any type of door latching could be employed and released, such as electric or magnetic latching.

Figure 4A:
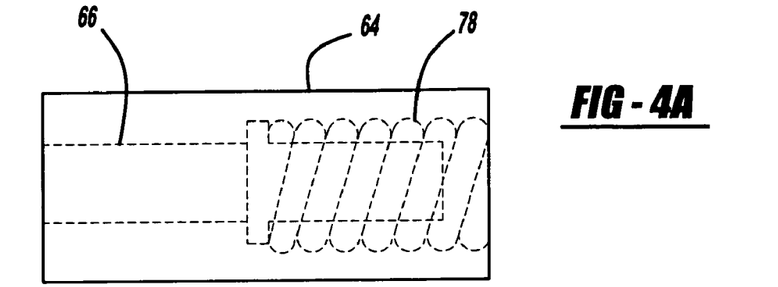
FIG. 4A is a side view of a spring-loaded mechanical device for setting a vehicle door in motion.
Figure 4B:
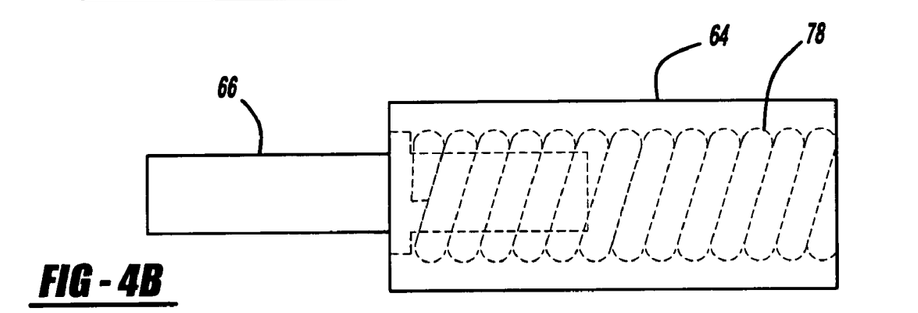
FIG. 4B is a side view of a spring-loaded mechanical device for setting a vehicle door in motion.

With reference to FIGS. 1, 3 and 4, immediately upon releasing the rear door 16, an actuator 64, also known as a "door popper," may release a stored force from a spring 78, which forces a movable shaft 66 against an interior surface of the rear door 16 to cause the rear door 16 to quickly "pop open" a short distance. The distance the rear door 16 opens directly depends upon the force that the spring 78 exerts against the rear door 16. Therefore, different springs could be used to achieve a desired opening force or distance. Additionally, the rear door 16 may be equipped with spring-loaded hinges and incremental door stops that assist in governing how far and how fast the rear door 16 is permitted to open upon activation of the actuator 64.

With the rear door 16 open a short distance, a user 46 is able to further open the rear door 16 to its fullest extent, or the desired extent, by simply using his or her elbow or knee. A user's elbow or knee may be used to place between the door 16 and vehicle 10 to then force the door 16 open. In this manner, if a user is carrying a package with both hands, or has both of her hands occupied for any reason, any door on the vehicle 10 can be successfully opened without having to set the package down. Additionally, the package would not have to be held against the vehicle with one hand while the other hand is used to unlock and swing open the rear door 16.

FIGS. 4A and 4B depict a spring loaded actuator 64 having a movable shaft 66 that lies within an interior portion of the actuator 64. When the actuator 64 is activated, the movable shaft 66 is forced from the actuator 64 by a spring 78. When the door 16 is closed by the user 46, the movable shaft 66 again returns to the interior of the actuator 64, thereby compressing the spring 78, to prepare for the next door opening. While FIGS. 4A and 4B depict a manual activator 64 that utilizes a spring 78, an electromechanical solenoid, a hydraulic opener, a pneumatic opener, or other device could also be used to initially open the door in place of the manual activator 64.

Figure 5:
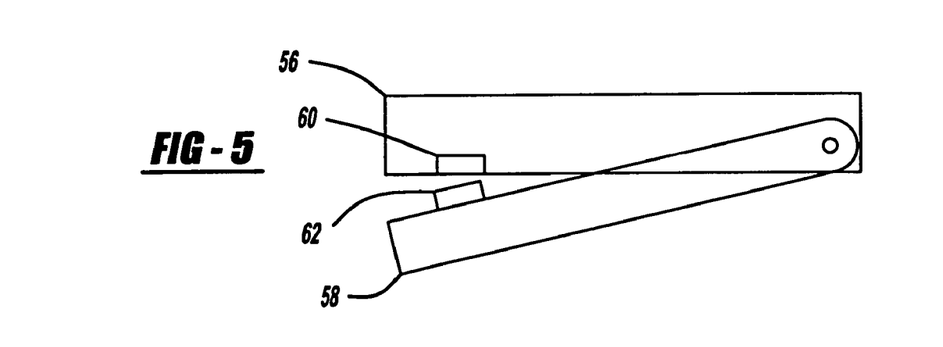
FIG. 5 is side view of a kick switch used to activate a solenoid device.

Although opening the unlocked door may be accomplished by using the laser emitter 52 of the above example, other devices may be used. For instance, also depicted in FIGS. 1, 2 and 5, is a mechanical kick switch 56. Only one of the laser emitter 52 or kick switch 56 is normally installed on a vehicle, although both are depicted in FIGS. 1 and 2 for illustrative convenience. The kick switch 56 differs from the laser emitter 52 in that the kick switch 56 requires physical contact of an upper contact 60 and a lower contact 62, which is located on the lower swing plate 58 with which a user may make physical contact with his foot. More specifically, upon communication between the smart ECU 20 and the fob 18, and ultimate identification verification of the fob 18, the kick switch 56 can be "kicked" by the user 46 such that the lower swing plate 58 pivots enabling the lower contact 62 to make contact with the upper contact 60. Although a kick switch 56 is depicted, a hip switch 94 may be employed to effectuate the same result. For instance, a hip switch 94 may be installed at hip level next to the door 16 to be opened by the system. In such an installation, instead of using the kick switch 56 or laser emitter 52, a user could make physical contact with a hip switch 94 to ultimately open any door, such as door 16.

With reference to FIGS. 1, 3, 5 and 6, to further explain the kick switch 56, when the lower contact 62 makes electrical contact with the upper contact 60, the unlocking, unlatching and door-opening scenario, explained above in the example employing the laser emitter, is accomplished. That is, a signal is sent to the smart ECU 20, which then sends a door open request signal to a door lock ECU 70. The door lock ECU 70 causes the rear driver side lock motor 40 to activate and unlock the door lock 31. Immediately after the door lock 31 unlocks, communication continues and a signal is sent from the door lock ECU 70 to the door open ECU 72, which activates a door release solenoid 74. The door release solenoid 74 causes a door latch 76 to release the rear door 16 so that the door is capable of being opened. With additional reference to FIG. 4, immediately upon releasing the rear door 16, an actuator 64, also known as a "door popper," releases a force from a spring 78, which forces a movable shaft 66 against an interior surface of the rear door 16 to cause the rear door 16 to open a short distance. The distance the rear door 16 opens directly depends upon the force that the spring 78 exerts against the rear door 16.

While the vehicle 10 of FIG. 1 depicts both, a laser emitter 52 and a kick switch 56, only one detection device need be employed for the user to request unlocking, unlatching and opening of a door, such as the rear door 16. Additionally, while the operation of the teachings of the invention has been explained using a traditional, vertically-hinged swing-open type door, such teachings could be employed on other types of doors.

With reference to FIG. 2, a mini-van type vehicle 80 is depicted employing the teachings of the present invention. More specifically, the hands-free vehicle door opener 12 may be employed with a sliding door 82 on the side of a vehicle 80. In such an application, the laser emitter 52 or kick switch 56 is located under or near the door that is desired to be opened. Again, while both the laser emitter 52 and kick switch 56 are both depicted in FIG. 2, only one needs to be installed during operation of the hands-free vehicle door opener 12.

When installed in a mini-van 80 or other vehicle with a sliding door 82, the hands-free vehicle door opener 12 would operate similarly to the above examples in which a vertically hinged swinging door 16 is opened. In the case of a sliding door 82, upon communication between the smart ECU 20 and the fob 18, and identification verification of the fob 18, the user would activate either of the laser emitter 52, by waving a foot or other object under the laser beam 54, or the kick switch 56, by pressing a foot against the lower swing plate 58 so that the upper contact 60 and lower contact 62 can make contact and complete an electrical circuit. Upon such activation, the Smart ECU 20 communicates with the door lock ECU 70 so that a door lock motor 88 can unlock a door lock 90. Upon unlocking of the door lock 90, a door release solenoid 92 releases, or unlatches, a door latch 94. Continuing with FIG. 2, upon unlatching of the sliding door 82, a motor 84, located in the sliding door 82 or roof 86, is electrically energized and causes the sliding door 82 to slide open, thus completing the operation of the hands-free vehicle door opener 12 and permitting the user to place a package, held by both hands of the user, within the vehicle 80.

The teachings of the present invention permit a vehicular sliding door to be opened from outside of a vehicle. Similarly, although not depicted in the figures, a top-pivoting rear lift gate or bottom pivoting rear tail gate could also be operated in a similar fashion. That is, in conjunction with a smart key system, a laser emitter or kick switch could be used to open a lift gate or tail gate when a user's hands are occupied.

Although the teachings above are generally described using a smart key system in which a user does not need to hold a key fob or press a fob button, operation of the hands-free vehicle door opener system 12 is not dependent upon employing such a system. Any system to turn on the laser emitter 52 or the kick switch 56 in preparedness for activation may be employed. Alternatively, when the vehicle 10, 80 is not locked, the kick switch 56 may be in a state of preparedness and need only be activated, that is, kicked, to invoke door opening.

Figures 7, 8:
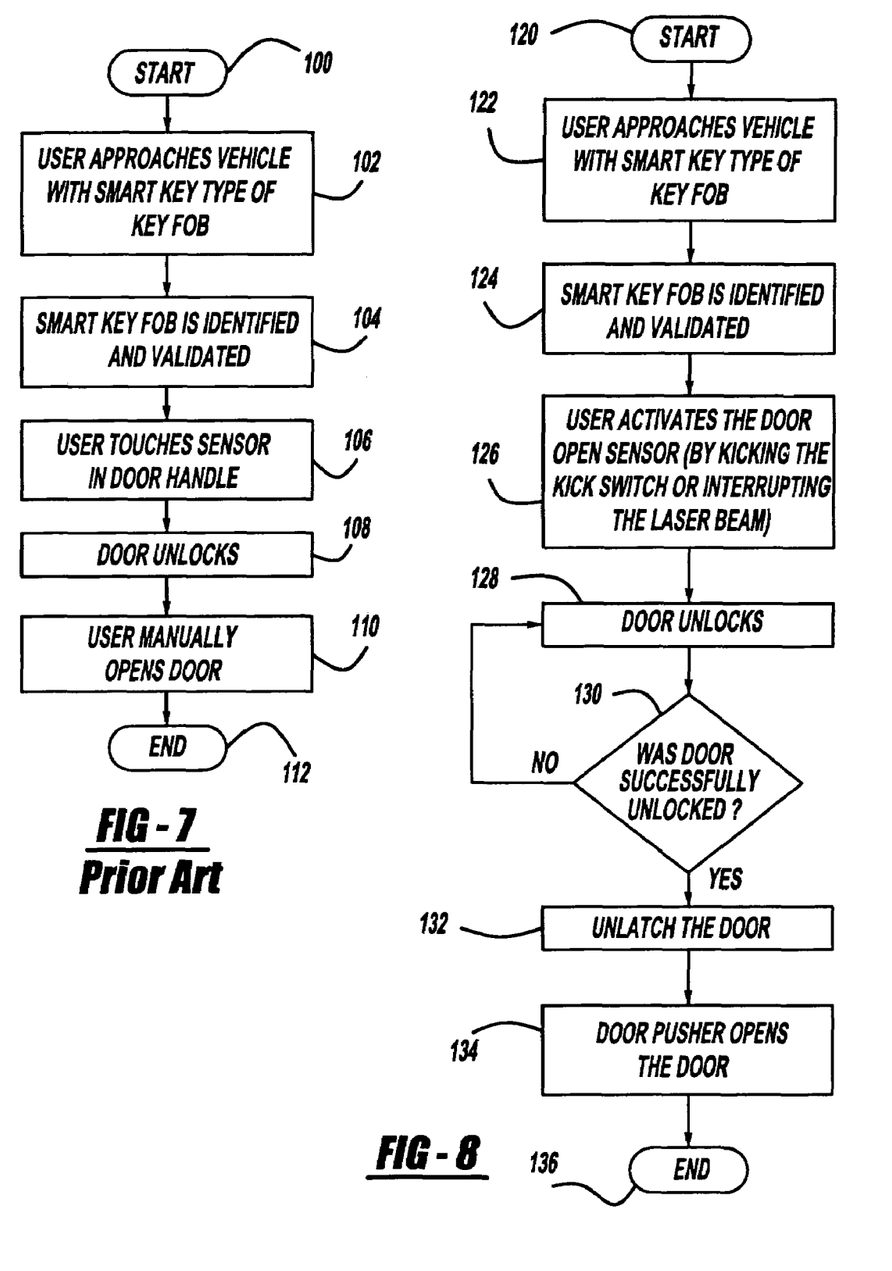
FIG. 7 is a flowchart of a prior art process used to unlock a vehicle door.
FIG. 8 is a flowchart of an automatic door opening flow process.

While the invention has been described above using FIGS. 1-6, which depict physical devices in their respective locations, FIG. 8 is a flowchart that generally depicts the operational process flow of the hands-free vehicle door opener 12. FIG. 7, which is a flowchart of traditional smart key door unlocking logic, is depicted for contrast with FIG. 8.

For comparison purposes, FIG. 7 depicts a prior art door-unlocking routine beginning at step 100. At step 102, a user approaches the vehicle, employing a smart key type of entry system, with a key fob. At step 104, the smart key fob is identified and the smart key is validated. At step 106, the user touches a sensor in a door handle, which causes the unlocking of the door, as indicated at step 108. At step 110, the user must manually open the vehicle door by pulling on a door handle with a hand to gain access to the vehicle interior. The process ends at step 112.

FIG. 8 is a flowchart that generally depicts an automatic door unlocking routine according to the teachings of the present invention. Additional reference may be made to FIG. 1 and FIGS. 3-6. The routine begins at step 120 and proceeds to step 122 where a user approaches a vehicle, such as a vehicle 10 (FIG. 1) or vehicle 80 (FIG. 2), with a key fob 18 that is part of a smart key entry type system. At step 124, the smart key fob 18 is identified and validated as a smart key by the communication of a key fob 18 code. As explained above, this identification and validation process involves a user 46 approaching the vehicle 10 while the smart ECU 20 emits a radio frequency signal 48 from the door antennas 22, 24, 26, 28. When the fob 18 is brought within the range of the smart ECU 20 signal 48, the fob 18 responds with a fob signal 50 and the smart ECU 20 verifies the fob signal 50 and as a result, verifies the identification of the specific fob 18.

As a result of the verification process, the door lock 31 is placed in unlock standby mode. Again, the system may be configured to only place door lock 31 in unlock standby mode when the fob 18 is closest to door lock 31. While in unlock standby mode, the contact sensor 36 within the door handle 32 is prepared to receive physical contact, such as from a human hand to unlock a door lock 31. However, at step 126 the user may activate one of the door open sensors 52, 56, whichever, a vehicle is so equipped. This activation is accomplished when the user either kicks the kick switch 56, or interrupts the laser beam 54 of the laser beam emitter 52. Only one of the kick switch 56 or laser emitter 52 need be located on the vehicle.

At step 128 the vehicle door(s) that is associated with the kick switch 56 or laser emitter 52 is unlocked. When the door lock 31 is placed in unlock standby mode when the fob 18 enters the radio frequency range of the antenna 24 and the fob 18 communicates its specific identification code, which is received and verified by the smart ECU 20, a laser emitter 52, as an example, begins emitting a laser beam 54. The laser emitter 52 may be positioned directly below the rear door 16 as depicted in FIG. 1, or in another convenient location on the vehicle 10. Since a user's hands may be full, or the user 46 does not want to use his hand(s) to unlock and open a door 16, a user 46 need only pass his foot 47 through the laser beam 54, which is directed at the ground in FIG. 1. By interrupting the laser beam 54, the door 16 is caused to unlock at step 128. This unlocking is verified at step 130, and control returns to step 128 if the lock 31 was not successfully unlocked. After the door is unlocked, then the door is immediately caused to unlatch at step 132. Elaborating on the door unlocking process, when the laser beam 54 is interrupted, a signal is sent to the smart ECU 20, which then sends a door open request signal to a door lock ECU 70. The door lock ECU 70 causes the rear driver side lock motor 40 to activate and unlock the door lock 31.

Immediately after the door lock 31 unlocks, communication continues and a signal is sent from the door lock ECU 70 to the door open ECU 72, which activates a door release solenoid 74. The door release solenoid 74 causes a door latch 76 to release the rear door 16 so that the door is capable of being opened. At step 134, immediately upon releasing the rear door 16, an actuator 64, also known as a "door pusher" or "door popper," releases a force from a spring 78, which forces a movable shaft 66 against an interior surface of the rear door 16 to cause the rear door 16 to open a short distance. The routine of FIG. 8 then ends at step 136. Although a spring 78 is described and depicted as a device to cause the rear door 16 to pop open, other devices could be employed. For instance, an electrical device, such as a solenoid, could be used to pop open the door 78 upon releasing the door latch 76. Additionally, a pneumatic or hydraulic device could be used to force the door 78 open upon releasing the door latch 76.

Although passenger doors 14, 16 have been used as examples of devices that may automatically be "popped open" when a kick switch 56 is activated, or a laser beam 54 of laser beam emitter 52 is interrupted, other devices may be opened. For instance, a vehicle trunk or minivan rear lift gate may be popped open in a similar fashion as that described above.

In the teachings presented, a kick switch 56 and a laser beam emitter 52 are exemplified as means for opening a vehicle door 16, 82; however, other means could be used. For example, the door handle 30, 32 could function as a touch sensor or employ a touch sensor 34, 36 to activate a door popping device 64. As another example, an ultrasonic sensor or voice sensor could be used in place of, or in addition to, the kick switch 56 and laser beam emitter 52. In such an installation, after the smart key is recognized and verified, a user would speak into a microphone (not shown) that would recognize the voice of the user or a specific command, such as "door open," of any user with the correct fob 18.

In still yet another method of popping a door 16, an additional antenna 21 may be used to detect the fob 18 when, for example, the fob 18 is a specific distance, such as three inches for example, from the additional antenna 21. In this fashion, no kick switch 56, laser beam emitter 52, or voice recognition device would be necessary. To cause a vehicle door 16 to pop open, the user would simply need to place the fob 18, which could be in a pocket or handbag, a short but specific distance from the antenna 21. The additional antenna 21 could be used in a smart key entry system that polls for the key fob 18 or in a non-polling system. In a non-polling system, the antenna 21 would first sense the key fob 18 just three inches away, and then the key fob 18 would be identified and validated by the smart ECU 20. This is generally the opposite from a polling system. Generally, other sensors or devices, which can be activated by a user who might be holding a package with both hands, may be employed. For example, if the trunk of a vehicle is to be opened, a mechanical switch could be located on the top of the vehicle's rear bumper. This would make it possible for a person carrying a box to simply set the box down on the bumper switch, thereby causing the trunk to pop. After such a trunk popping, the user may use his or her elbow to further open the trunk. Again, such a trunk switch could be activated after the key fob 18 is identified and validated if the smart key system is a polling system, or the trunk switch could be activated before the key fob 18 is identified and validated if the smart key system is a non-polling system.

Although a user may desire to open a door 16 he or she may then decide to place the package that he or she was holding in another location. In such a situation, the system could be equipped with an audible alarm 98 to audibly alert a user that the vehicle door 16 that was opened, was not yet closed, but in fact remains in its opened condition. Such an audible alert could be set to sound after a predetermined amount of time to indicate to the user 46 that the open door is in need of closing. Such an alarm 98 may be connected to the door open ECU 72, as an example.

In another scenario, in the event that a vehicle 10 is sitting on a grade and a user requests that a door of the vehicle 10 be opened, the vehicle door opening system 12 may be equipped with a tilt sensor 96, such as a mercury switch, which is capable of electrically disabling the vehicle door opening system 12. That is, when the vehicle is sitting on a particular grade such that popping open a door 16 open could cause the door to continue opening to its full extent and thereby cause damage to an adjacent vehicle, structure or even the hinges or the door 16 if a door opens to hard, the vehicle door opening system 12 would be incapable of operating. In order to prevent the vehicle door opening system 12 from operating, the tilt sensor 96 would send a signal to the ECU 72 to which it would be connected, so that the door release solenoid 74 will not permit unlatching of the door 16.

While the teachings above make reference to a smart key type of validation system that verifies a fob 18 before the user 46 actually reaches the vehicle 10, the teachings are not limited to such. For example, the key fob 18 validation system could be one in which the key fob 18 is verified upon the kick switch 56 or hip switch 94 being activated by the user 46. In such a system, the user 46 would simply activate the kick switch 56 or hip switch 94, which would then begin the key fob 18 verification process. Upon verification, this non-polling entry system, would then permit the door 16 to pop open. Such a process is depicted in FIG. 9.

Figure 9:
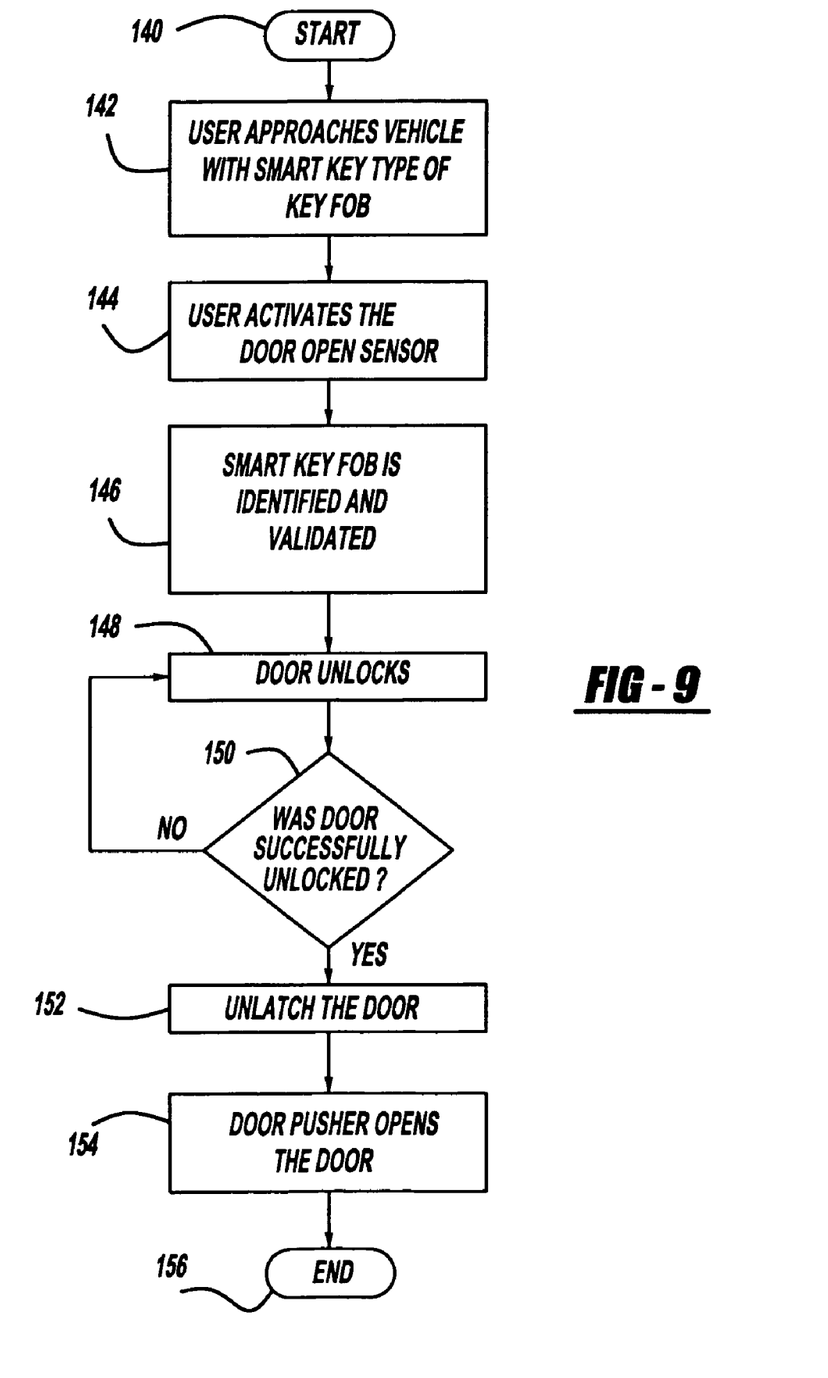
FIG. 9 is a flowchart of an automatic door opening flow process.

FIG. 9 is a flowchart that generally depicts another embodiment of an automatic door unlocking routine according to the teachings of the present invention. FIG. 9 differs from FIG. 8 in that FIG. 8 depicts flow logic that utilizes a smart key entry system that utilizes polling, whereas the flow logic of FIG. 9 does not depict a polling type of smart key entry system. The logic of FIG. 9 begins at step 140, and at step 142 a user approaches the vehicle 10 with a smart key type of key fob 18. At step 144, a user activates a door open sensor, by kicking a kick switch 56 or interrupting a laser beam 54 of a laser beam emitter 52, for example. Alternatively, a bumper switch 57 could be activated when a user sets a package onto a bumper switch 57. In yet other examples of sensors, a hip switch 94 could be activated, much like a bumper switch 57, or the key fob 18 could be moved next to an antenna 21 that would detect the very close proximity of the key fob 18. Next, at step 146 a smart ECU 20 identifies and verifies that the key fob being used is a valid key fob for the particular vehicle 10. After key fob validation at step 146, the particular door is unlocked at step 148, step 150 ensures that the door was successfully unlock, step 152 performs door unlatching, and the door pusher opens the door before the routine ends at step 156.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
    a vehicle door having a door lock and a door latch and a door open ECU;
    a smart key fob transponder;
    a smart electronic control unit within a vehicle, wherein the smart electronic control unit communicates with the smart key fob transponder when the smart key fob transponder is within a predetermined range outside the vehicle door and outside the vehicle, the smart electronic control unit verifying that the smart key fob transponder possesses a unique security code;
    a door lock electronic control unit, the door lock electronic control unit receiving a door unlock request from the smart electronic control unit after verification of the unique security code and unlocking the door lock;
    a door release solenoid, wherein the door release solenoid unlatches the door latch from the vehicle door upon the door open ECU receiving a signal from the door lock electronic control unit for unlocking of the door lock;
    a door push device; and
    a laser emitting detector device located outside of and on a vehicle, wherein upon activation of the detector by detection of a user outside of the vehicle who has possession of the smart key fob transponder, the door push device opens the door after the door has been unlocked and unlatched, providing the user to access the inside of the vehicle.

2. The apparatus of claim 1, wherein the door push device further comprises:
    a shaft; and
    a spring, the shaft contacting and pushing against the door to open the door when the spring decompresses.

3. An apparatus for opening a door of a vehicle, the apparatus comprising:
    a door latch attached to the vehicle door;
    a door latch release for releasing the door latch;
    a smart electronic control unit within the vehicle, wherein the smart electronic control unit communicates with the smart key fob transponder when the smart key fob transponder is within a predetermined range outside said vehicle door and said vehicle, the smart electronic control unit verifying that the smart key fob transponder possesses a unique security code;
    a door lock electronic control unit, the door lock electronic control unit receiving a door unlock request from the smart electronic control unit after verification of the unique security code and unlocking the door lock;
    a door opener that pushes against the inside surface of the vehicle door upon unlocking of the door lock and opens the vehicle door from a vehicle door closed position, the door opener further comprising:
    a shaft; and
    a spring that biases against the shaft, which pushes against the door;
    a laser detector that is a laser emitter and emits a laser and detects laser interruption when an object passes through the laser, the laser detector located outside of the vehicle, wherein upon interruption of the laser of the laser detector, the door opener opens the door upon release of the door latch, providing hands-free access to an inside of the vehicle.

4. An apparatus for opening a door of a vehicle, the apparatus comprising:
    a door lock attached to the vehicle door;
    a door latch attached to the vehicle door;
    a door latch release for releasing the door latch;
    a door opener that opens the vehicle door from a vehicle door closed position; and
    a laser emitting detector device located on and outside of the vehicle and under the vehicle, wherein upon activation of the detector by detection of a human outside of the vehicle, the door opener automatically opens the door after release of the door latch providing hands-free access to an inside of the vehicle.

5. The apparatus of claim 4, wherein the door opener further comprises:
    an electric motor to open the door.

6. The apparatus of claim 4, wherein the door opener further comprises:
    a shaft; and
    a spring that biases against the shaft, which pushes against the door.

7. The apparatus of claim 5, further comprising:
    a door open ECU;
    a smart key fob transponder remote from the vehicle;
    a smart electronic control unit in the vehicle, wherein the smart electronic control unit communicates with the smart key fob transponder when the smart key fob transponder is within a predetermined range, the smart electronic control unit verifying that the smart key fob transponder possesses a unique security code;
    a door lock electronic control unit, the door lock electronic control unit for receiving a door unlock request from the smart electronic control unit and unlocking the door lock after verification of the unique security code;
    a door release solenoid, wherein the door release solenoid unlatches the door latch from the door upon the door open ECU receiving a signal from the door lock electronic control unit and unlocking of the door lock; and
    a tilt sensor, wherein when the vehicle is sitting on a predetermined grade, the tilt sensor communicates with the door open ECU to prevent activation of the door release solenoid to prevent unlatching of the door.

* * * * *